United States Patent Office 3,336,293
Patented Aug. 15, 1967

3,336,293
COMPLEX AMIDES OF 5,6-DIHYDROPHENAN-THRIDINE - 5 - CARBOXYLIC ACID, 5,6-DIHY-DRO - 11H - DIBENZ[b,e]AZEPINE-5-CARBOX-YLIC ACID, AND RELATED COMPOUNDS
John W. Cusic and William E. Coyne, Skokie, Ill., assignors to G. D. Searle & Co., Chicago, Ill., a corporation of Delaware
No Drawing. Filed Nov. 6, 1964, Ser. No. 409,611
6 Claims. (Cl. 260—239)

The present invention relates to a group of compounds which are complex amides of polycyclic N-carboxylic acids. In particular, the present invention relates to a group of compounds having the following general formula

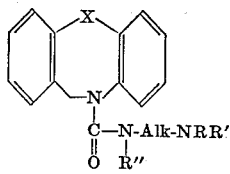

wherein X is selected from the group consisting of a bond connecting the two phenyl rings, methylene, ethylene, and vinylene; Alk is lower alkylene; —NRR' is selected from the group consisting of di(lower alkyl)amino, 1-pyrrolidinyl, piperidino, morpholino, 4-methyl-1-piperazinyl, and N-benzylmethylamino; and R'' is lower alkyl or hydrogen.

Thus, depending on the value assigned to X, the tricyclic nucleus in the above formula can be 5,6-dihydrophenanthridine, 5,6-dihydro-11H-dibenz[b,e]azepine, 5,6-dihydrodibenz[b,f]azocine, and 5,6,11,12 - tetrahydrodibenz[b,f]azocine. The lower alkylene radicals referred to above separate the nitrogen atoms attached thereto by at least 2 carbon atoms and contain up to 6 carbon atoms. Examples of such lower alkylene radicals are ethylene, trimethylene, and 1,4-pentylene. The lower alkyl radicals referred to above contain up to 6 carbon atoms and can be exemplified by methyl, ethyl, propyl, isopropyl, and the like. Examples of di(lower alkyl)amines would then be dimethylamino, diethylamino, dipropylamino, diisopropylamino, and the like.

The compounds of this invention are useful because of their pharmacological properties. In particular, they possess anti-inflammatory activity which is demonstrated by their phenylbutazone-like effect on edematous conditions. The compounds also possess anti-atherogenic activity. In addition, these compounds possess anti-biotic activity against a variety of organisms. Thus, they inhibit the growth of bacteria such as *Diplococcus pneumoniae*, protozoa such as *Tetrahymena gelleii*, fungi such as *Trichophyton mentagrophytes* and *Candida albicans*, and algae such as *Chlorella vulgaris*; they also inhibit germination of seeds of Trifolium.

The organic bases of this invention form pharmaceutically acceptable, nontoxic, acid addition salts with a variety of organic and inorganic acids. Such salts are formed with acids such as sulfuric, phosphoric, hydrochloric, hydrobromic, hydriodic, sulfamic, citric, lactic, maleic, malic, oxalic, succinic, tartaric, cinnamic, acetic, benzoic, gluconic, ascorbic, and related acids. They also form quaternary ammonium salts with a variety of organic esters of sulfuric, hydrohalic, and aromatic sulfonic acids. Among such esters are methyl chloride and bromide, ethyl chloride, dimethyl sulfate, and methyl benzenesulfonate.

The compounds of the present invention are prepared from an amine of the following formula

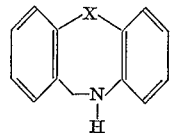

wherein X is defined as above. This compound is reacted with phosgene to give the corresponding N-carbonyl chloride which is then reacted with the appropriate dialkylaminoalkylamine or a similar compound to give the compounds of the present invention.

The following examples are presented to further illustrate the present invention; they should not be construed as limiting it in spirit or in scope. In these examples, quantities are indicated in parts by weight and temperatures in degrees centigrade (° C.).

Example 1

To a stirred solution of 25 parts of phosgene in 45 parts of toluene at 5° C. there is first added 140 parts of ether and then a solution of 27 parts of 5,6-dihydrophenanthridine and 15.2 parts of triethylamine in 268 parts of methylene chloride. During this addition, the temperature is maintained at about 7° C. The resultant suspension is stirred for 2 hours after addition is complete and then filtered. The solvent is evaporated from the filtrate and the resultant residue is recrystallized from a mixture of benzene and petroleum ether to give 5,6-dihydrophenanthridine-5-carbonyl chloride melting at about 63.5–65.5° C.

Example 2

A solution is prepared from 20 parts of phosgene and 45 parts of toluene, and cooled to 5° C.; 105 parts of ether is added. The solution is then maintained at about 7° C. while a solution of 23 parts of 5,6-dihydro-11H-dibenz[b,e]azepine and 12 parts of triethylamine in 270 parts of methylene chloride is added. The mixture is stirred for an additional hour and filtered and the solvent is evaporated from the filtrate. The resultant residue is recrystallized from petroleum ether to give 5,6-dihydro-11H-dibenz[b,e]azepine-5-carbonyl chloride melting at about 98–102° C.

Example 3

The procedure of Example 1 is repeated using 22 parts of 5,6,11,12-tetrahydrodibenz[b,f]azocine, 21 parts of phosgene and 10.5 parts of triethylamine. The crude product is recrystallized from petroleum ether to give 5,6,11,12-tetrahydrodibenz[b,f]azocine-5-carbonyl chloride melting at about 95.5–97.5° C.

Example 4

4.1 parts of 5,6-dihydrodibenz[b,f]azocine is reacted with 2 parts of phosgene in the presence of 1.8 parts of triethylamine according to the procedure described in Example 1. The crude product thus obtained is 5,6-dihydrodibenz[b,f]azocine-5-carbonyl chloride and it is mixed with 2 parts of 2-diethylaminoethylamine and 120 parts of 2-butanone and refluxed for 4 hours. The solvent is evaporated from the solution and the residue is dissolved in water and made alkaline with aqueous sodium hydroxide solution. The resultant alkaline mixture is extracted with several portions of ether and the combined ether extracts are dried over anhydrous potassium carbonate. The ether solvent is evaporated and the residue is dissolved in ethyl acetate and treated with charcoal. Evaporation of the solvent gives N-(2-diethylaminoethyl)-5,6-dihydrodibenz[b,f]azocine-5-carboxamide as an amber oil. This compound has the following formula

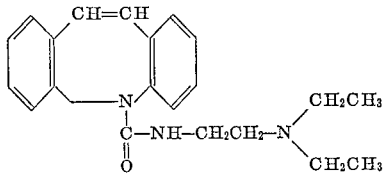

Example 5

The crude 5,6-dihydrophenanthridine-5-carbonyl chloride obtained from 9 parts of 5,6-dihydrophenanthridine and phosgene according to the procedure described in Example 1 is dissolved in 160 parts of butanone together with 5.8 parts of 2-diethylaminoethylamine and the solution is refluxed for 18 hours. The solvent is evaporated under reduced pressure and the residue is suspended in an excess of aqueous potassium hydroxide solution. The alkaline solution is extracted with ether and the ether extract is dried over potassium carbonate. The ether solvent is evaporated and the residual crude oil is treated with a solution of 4.5 parts of oxalic acid in ethanol. The solid which precipitates is recrystallized from ethanol to give the oxalate salt of N-(2-diethylaminoethyl)-5,6-dihydrophenanthridine-5-carboxamide melting at about 122–124° C. The free base of this compound has the following formula

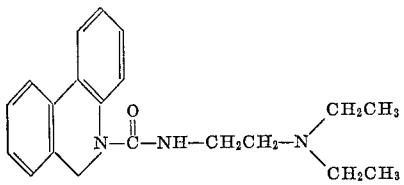

Example 6

If an equivalent quantity of 3-dimethylaminopropylamine is substituted for the 2-diethylaminoethylamine and the procedure of Example 5 is repeated, the product obtained is N-(3-dimethylaminopropyl)-5,6-dihydrophenanthridine-5-carboxamide oxalate.

Example 7

A solution of 5 parts of 5,6-dihydrophenanthridine-5-carbonyl chloride and 3.3 parts of 5-diethylaminoethyl-2-aminopentane in 160 parts of 2-butanone is refluxed for 18 hours. The solvent is then evaporated under reduced pressure and the resultant residue is suspended in an excess of aqueous potassium hydroxide solution and this solution is extracted with ether. The combined ether extracts are dried and the solvent is evaporated to leave the residual crude amine which is then dissolved in ethyl acetate and treated with charcoal. The solvent is evaporated to leave a residual oil which is N-(4-diethylamino-1-methylbutyl)-5,6-dihydrophenanthridine-5-carboxamide.

Example 8

3.8 parts of N,N,N'-triisopropylethylenediamine is substituted for the 5-diethylamino-2-aminopentane and the procedure described in Example 7 is repeated. The product thus obtained, as an amber oil, is N-(2-diisopropylaminoethyl)-N-isopropyl-5,6-dihydrophenanthridine-5-carboxamide.

In a similar manner, N,N,N'-trimethylethylenediamine reacts with 5,6-dihydrophenanthridine-5-carbonyl chloride to give N-(2-dimethylaminoethyl)-N-methyl-5,6-dihydrophenanthridine-5-carboxamide.

Example 9

The procedure described in Example 7 is repeated using 5 parts of 5,6-dihydrophenanthridine-5-carbonyl chloride and 2.4 parts of 2-(1-pyrrolidinyl)ethylamine in 2-buta-none. The crude product is reacted with oxalic acid in ethanol to give the oxalate of N-[2-(1-pyrrolidinyl)ethyl]-5,6-dihydrophenanthridine-5-carboxamide melting at about 170–172° C. the free base of this compound has the following formula

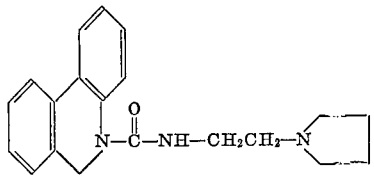

Example 10

The crude 5,6,11,12 - tetrahydrodibenz[b,f]azocine - 5-carbonyl chloride, obtained from 9.8 parts of 5,6,11,12-tetrahydrodibenz[b,f]azocine and phosgene according to the procedure described in Example 3, is dissolved in 160 parts of 2-butanone together with 5.5 parts of 2-diethylaminoethylamine. The resultant solution is refluxed for 8 hours and the solvent is then evaporated under reduced pressure. The resultant residue is suspended in an excess of aqueous potassium hydroxide solution and then extracted with ether. The combined ether extracts are dried and the solvent is evaporated to leave residual crude amine. This is dissolved in ethyl acetate and treated with charcoal and the solvent is again evaporated to leave a residual amber oil which is N-(2-diethylaminoethyl)-5,6,11,12-tetrahydrobenz[b,f]azocine - 5 - carboxamide. This compound has the following formula

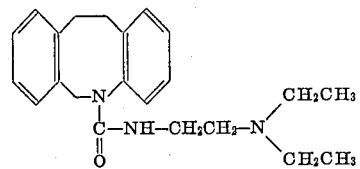

Example 11

The crude 5,6 - dihydro - 11H - dibenz[b,e]azepine - 5 - carbonyl chloride, obtained from 9.2 parts of 5,6 - dihydro - 11H - dibenz[b,e]azepine and phosgene, is reacted with 5.8 parts of 2-diethylaminoethylamine in 2-butanone according to the procedure described in Example 7. The crude product is mixed with an ethanol solution of oxalic acid to give the oxalate of N-(2-diethylaminoethyl)-5,6-dihydro - 11H - dibenz[b,e]azepine - 5 - carboxamide melting at about 141–143° C. The free amine has the following formula

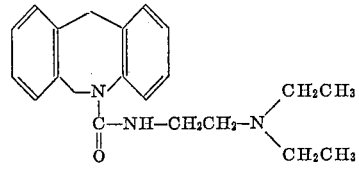

Example 12

If 5,6,11,12 - tetrahydrodibenz[b,f]azocine - 5 - carbonyl chloride is reacted with the appropriate aminoalkylamine according to the procedure described in Example 7, the following compounds are obtained:

N - (2 - piperidinoethyl) - 5,6,11,12 - tetrahydrodibenz[b,f]azocine - 5 - carboxamide melting at about 92–93.5° C.

N - (2 - morpholinoethyl) - 5,6,11,12 - tetrahydrodibenz[b,f]azocine - 5 - carboxamide.

N - [2 - (4 - methyl - 1 - piperazinyl)ethyl] - 5,6,11,12-tetrahydrodibenz[b,f]azocine - 5 - carboxamide.

Example 13

The procedure of Example 7 is repeated using 5.2 parts of 5,6 - dihydro - 11H - dibenz[b,e]azepine - 5 - carbonyl chloride, 3,6 parts of N - benzyl - N,N' - dimethylethylenediamine and 160 parts of 2-butanone. The product, isolated as an amber oil, is N - [2 - (N' - benzylmethylamino)ethyl] - N - methyl - 5,6 - dihydro - 11H - dibenz[b,e]azepine - 5 - carboxamide.

What is claimed is:

1. A compound of the formula

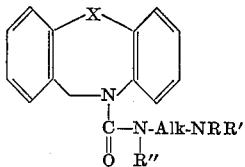

wherein X is selected from the group consisting of a bond connecting the two phenyl rings, methylene, ethylene, and vinylene; Alk is lower alkylene separating the nitrogens attached thereto by at least 2 carbon atoms; —NRR' is selected from the group consisting of di(lower alkyl)-amino, 1-pyrrolidinyl, piperidino, morpholino, 4-methyl-1-piperazinyl and N-benzylmethylamino; and R" is selected from the group consisting of hydrogen and lower alkyl.

2. A compound of the formula

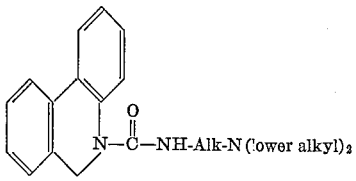

wherein Alk is lower alkylene separating the nitrogens attached thereto by at least 2 carbon atoms.

3. N - (2 - diethylaminoethyl) - 5,6 - dihydrophenanthridine-5-carboxamide.

4. N - [2 - (1 - pyrrolidinyl)ethyl] - 5,6 - dihydrophenanthridine-5-carboxamide.

5. N - (2 - diethylaminoethyl) - 5,6 - dihydro - 11H-dibenz[b,e]azepine-5-carboxamide.

6. N - (2 - diethylaminoethyl) - 5,6,11,12 - tetrahydrodibenz[b,f]azocine-5-carboxamide.

No references cited.

ALEX MAZEL, *Primary Examiner.*
ALTON D. ROLLINS, *Examiner.*